United States Patent
Brady

(10) Patent No.: US 9,840,190 B2
(45) Date of Patent: Dec. 12, 2017

(54) HAZARD ALERT SYSTEM

(71) Applicant: Barbara Brady, Port Washington, NY (US)

(72) Inventor: Barbara Brady, Port Washington, NY (US)

(*) Notice: Subject to any disclaimer, the term of this patent is extended or adjusted under 35 U.S.C. 154(b) by 74 days.

(21) Appl. No.: 14/927,319

(22) Filed: Oct. 29, 2015

(65) Prior Publication Data

US 2017/0120806 A1  May 4, 2017

(51) Int. Cl.
*B60Q 1/00* (2006.01)
*B60Q 1/32* (2006.01)

(52) U.S. Cl.
CPC .................... *B60Q 1/323* (2013.01)

(58) Field of Classification Search
CPC ........... H01L 2924/0002; H01L 51/529; H01L 2924/00; H01L 23/49562; H01L 2924/09701; H01L 2924/12044; H01L 51/5237; H01L 51/5262; B60Q 1/2665; B60Q 1/2669; B60Q 1/323; B60Q 3/59; B60Q 3/88
USPC ....... 340/468, 435, 471, 463, 470, 472, 473, 340/469, 425.5, 384.4
See application file for complete search history.

(56) References Cited

U.S. PATENT DOCUMENTS

| | | | |
|---|---|---|---|
| D333,010 S | 2/1993 | Lowe, Sr. | |
| 6,111,684 A * | 8/2000 | Forgette | B60Q 1/2665 |
| | | | 359/265 |
| 6,166,848 A * | 12/2000 | Cammenga | B60Q 1/2665 |
| | | | 359/265 |
| 6,184,786 B1 | 2/2001 | Medeiros | |
| 7,416,320 B2 | 8/2008 | Sakiyama et al. | |
| 8,007,148 B2 | 8/2011 | Yamauchi et al. | |
| 8,079,749 B2 | 12/2011 | Kitta | |
| 2005/0007645 A1* | 1/2005 | Tonar | B60Q 1/2665 |
| | | | 359/265 |
| 2011/0221589 A1 | 9/2011 | LeBeau et al. | |
| 2014/0118130 A1* | 5/2014 | Chang | G08G 1/163 |
| | | | 340/435 |
| 2015/0002288 A1* | 1/2015 | Lee | B60Q 1/323 |
| | | | 340/471 |

FOREIGN PATENT DOCUMENTS

WO  WO2014183741  11/2014

* cited by examiner

*Primary Examiner* — Daniel Previl

(57) ABSTRACT

A hazard alert system includes a vehicle that has a back side and at least one door that is hingedly coupled to the vehicle. The at least one door is positionable in an open position having the at least one door extending outwardly from the vehicle. An alert is coupled to the at least one door. The alert issues a visual alert when the at least one door is in the open position. Thus, oncoming traffic is alerted to avoid the at least one door.

6 Claims, 5 Drawing Sheets

HAZARD ALERT SYSTEM

BACKGROUND OF THE DISCLOSURE

Field of the Disclosure

The disclosure relates to alert devices and more particularly pertains to a new alert device for inhibiting an open vehicle door from being struck by oncoming traffic.

SUMMARY OF THE DISCLOSURE

An embodiment of the disclosure meets the needs presented above by generally comprising a vehicle that has a back side and at least one door that is hingedly coupled to the vehicle. The at least one door is positionable in an open position having the at least one door extending outwardly from the vehicle. An alert is coupled to the at least one door. The alert issues a visual alert when the at least one door is in the open position. Thus, oncoming traffic is alerted to avoid the at least one door.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
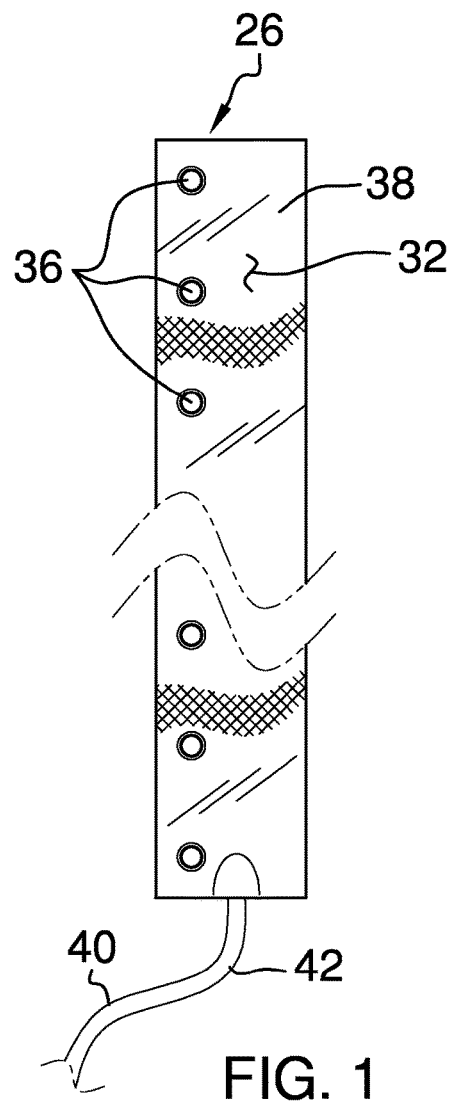
FIG. 1 is a front view of a hazard alert system according to an embodiment of the disclosure.
Figure 2:
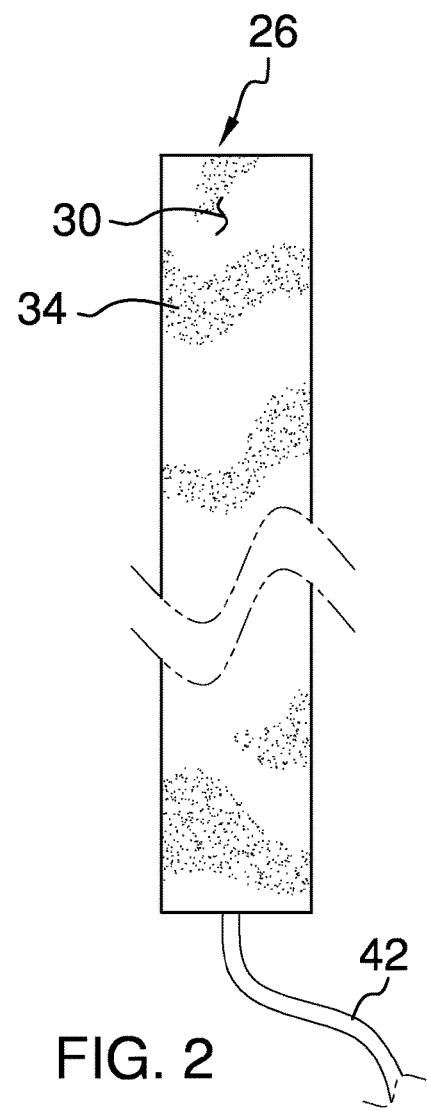
FIG. 2 is a back view of an embodiment of the disclosure.
Figure 3:
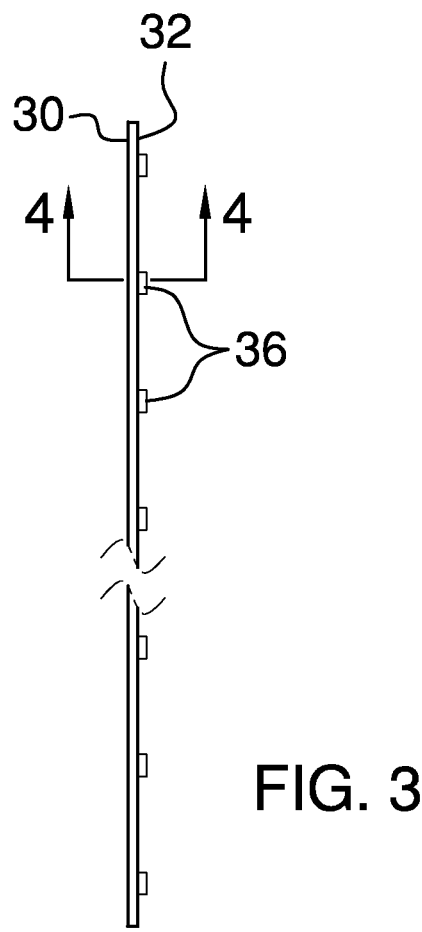
FIG. 3 is a right side view of an embodiment of the disclosure.
Figure 4:
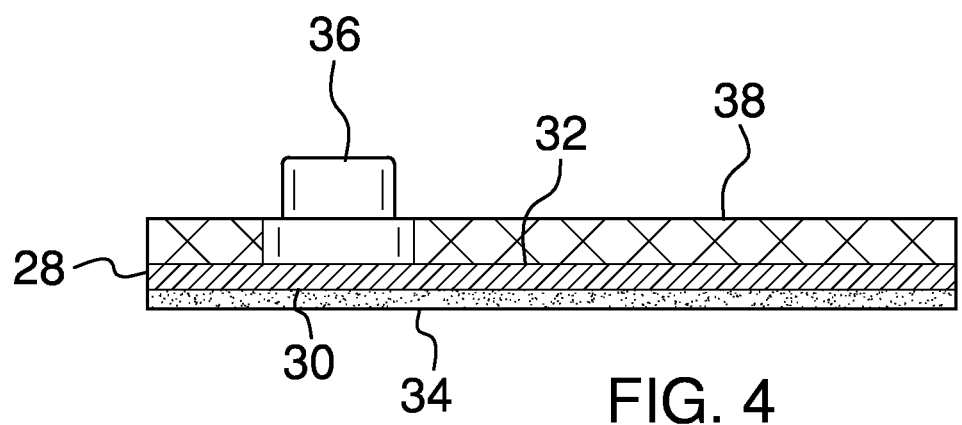
FIG. 4 is a cross sectional view taken along line 4-4 of FIG. 3 of an embodiment of the disclosure.
Figure 5:
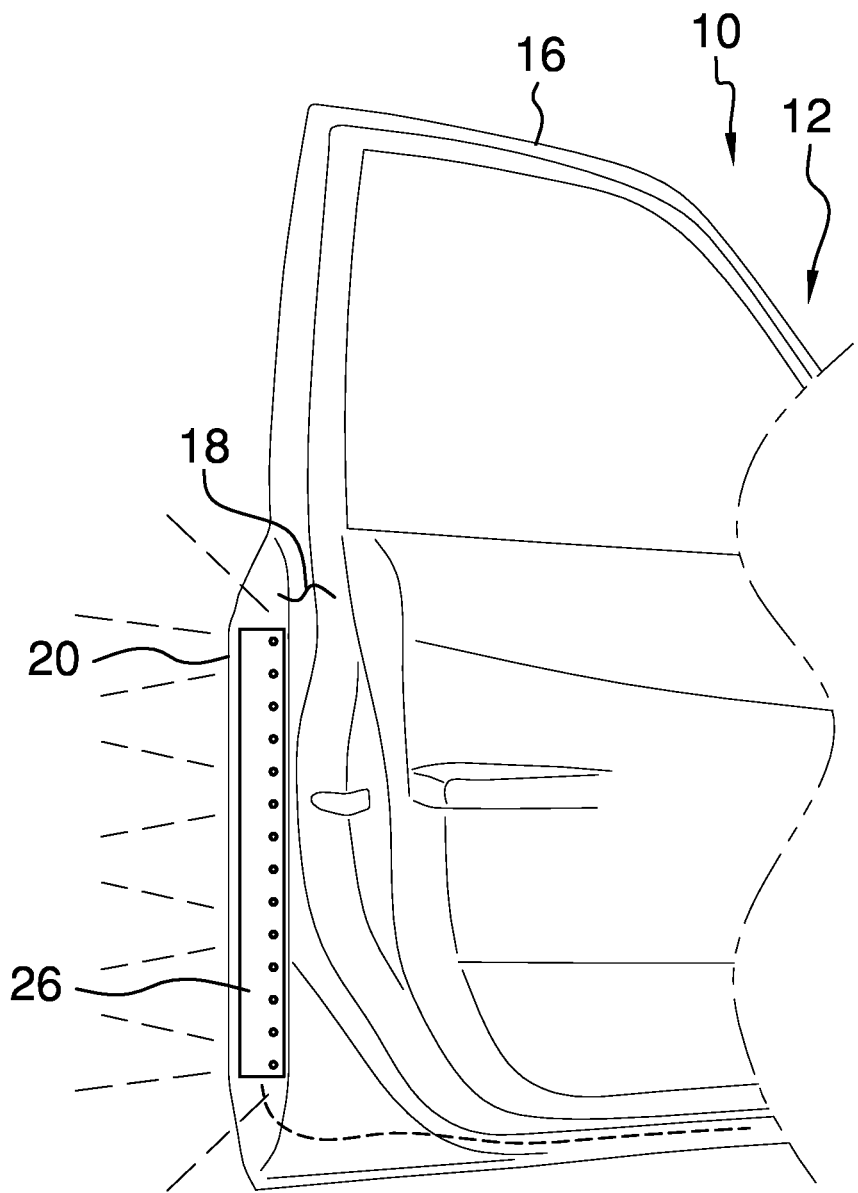
FIG. 5 is a perspective in-use view of an embodiment of the disclosure.
Figure 6:
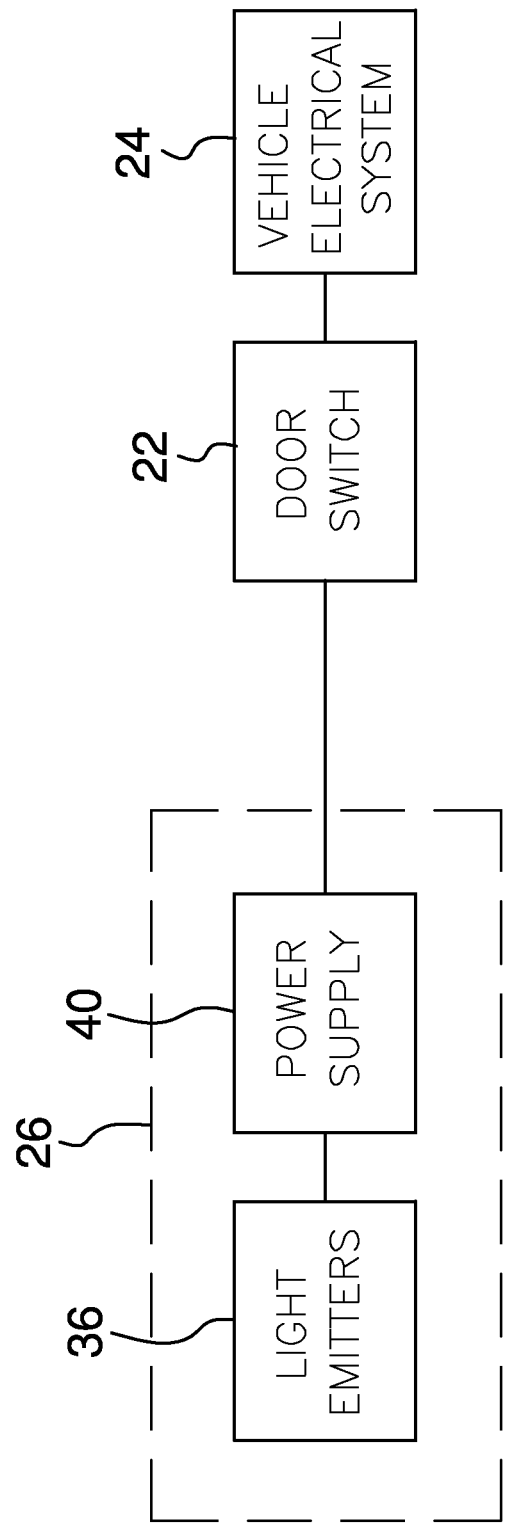
FIG. 6 is a schematic view of an embodiment of the disclosure.
Figure 7:
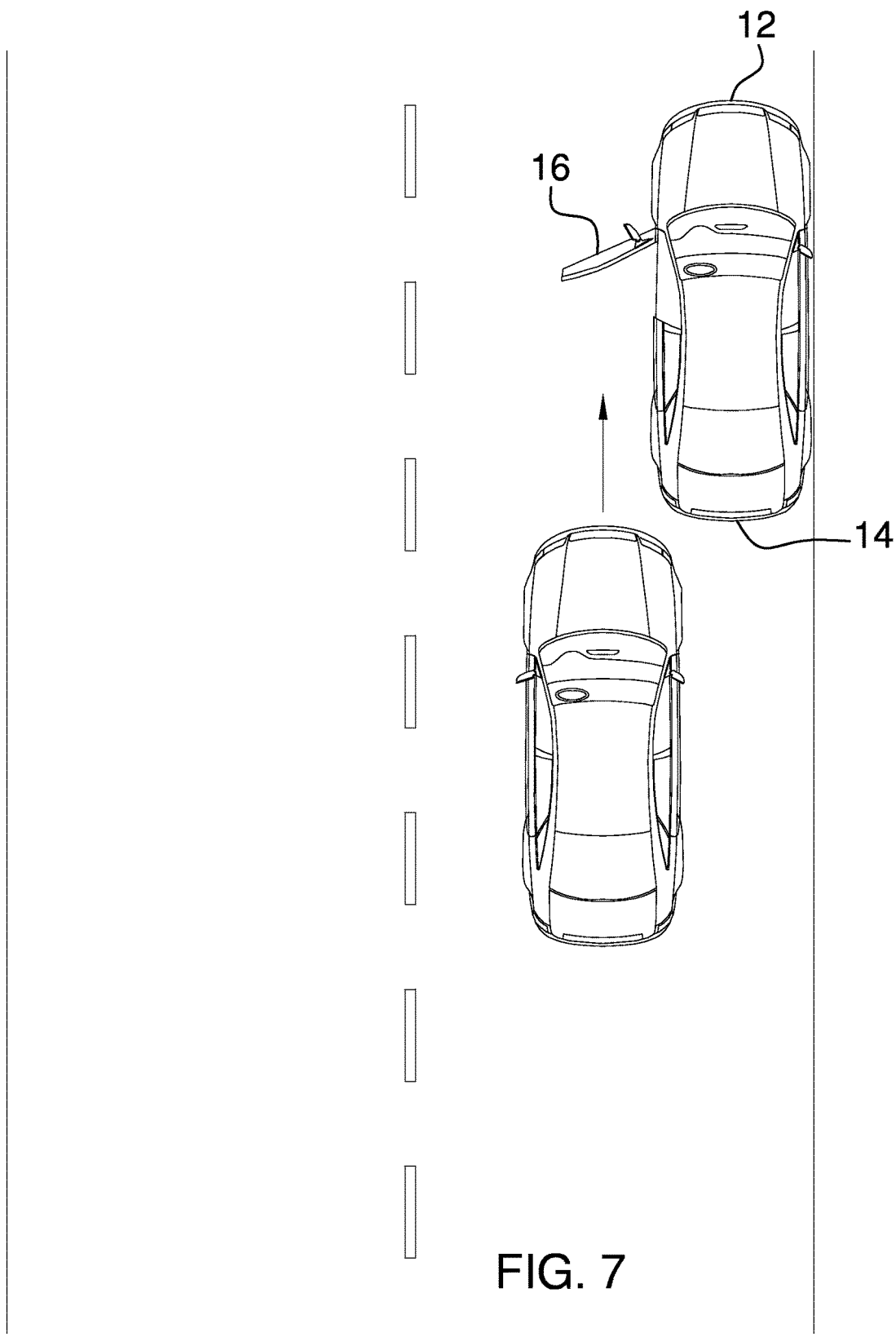
FIG. 7 is a top perspective in-use view of an embodiment of the disclosure.

With reference now to the drawings, and in particular to FIGS. 1 through 7 thereof, a new alert device embodying the principles and concepts of an embodiment of the disclosure and generally designated by the reference numeral 10 will be described.

As best illustrated in FIGS. 1 through 7, the hazard alert system 10 generally comprises a vehicle 12 that has a back side 14 and at least one door 16 that is hingedly coupled to the vehicle 12. The at least one door 16 has an inner surface 18 and an outer edge 20. The at least one door 16 is positionable in an open position having the at least one door 16 extending outwardly from the vehicle 12. The vehicle 12 may comprise a passenger vehicle or the like and the vehicle 12 may be parked on a shoulder of a roadway or the like.

The vehicle 12 includes at least one door switch 22. The at least one door switch 22 is operationally coupled to the at least one door 16. Thus, the at least one door switch 22 detects when the at least one door 16 is positioned in the open position. The at least one door switch 22 is electrically coupled to the vehicle's electrical system 24.

An alert 26 is coupled to the at least one door 16 and the alert 26 is positioned on the inner surface 18. The alert 26 issues a visual alert when the at least one door 16 is in the open position. Thus, oncoming traffic is alerted to avoid the at least one door 16. The oncoming traffic may be travelling along the roadway on which the vehicle 12 is parked.

The alert 26 comprises a panel 28 that has a first surface 30 and a second surface 32. An adhesive layer 34 is coupled to the first surface 30 and the adhesive layer 34 substantially covers the first surface 30. The adhesive layer 34 adhesively engages the inner surface 18 such that the panel 28 is retained on the at least one door 16. The panel 28 is positioned adjacent to the outer edge 20 and the panel 28 may be oriented to be substantially coextensive with the outer edge 20. The second surface 32 is directed toward the back side 14 of the vehicle 12 when the at least one door 16 is positioned in the open position. Thus, the panel 28 is visible to the oncoming traffic.

A plurality of light emitters 36 is provided and each of the light emitters 36 is coupled to the second surface 32. Thus, each of the light emitters 36 is visible to the oncoming traffic when the at least one door 16 is positioned in the open position. The light emitters 36 are spaced apart from each other and distributed along the panel 28. Each of the light emitters 36 may comprise a LED or the like.

A reflective layer 38 is coupled to the second surface 32. The reflective layer 38 enhances visibility of the panel 28 with respect to the oncoming traffic when the at least one door 16 is positioned in the open position. Each of the light emitters 36 extends through the reflective layer 38. The reflective layer 38 substantially covers the second surface 32.

A power supply 40 is coupled to the panel 28. The power supply 40 is electrically coupled between each of the light emitters 36 and the at least one door switch 22. The power supply 40 turns on each of the light emitters 36 when the at least one door switch 22 detects the at least one door 16 is positioned in the open position. The power supply 40 comprises a cord 42 extending outwardly from the panel 28.

In use, each of the light emitters 36 are turned on when the at least one door 16 is positioned in the open position. The at least one door 16 extends into the roadway when the at least one door 16 is in the open position. Thus, oncoming traffic is alerted that the at least one door 16 is in the open position. Each of the light emitters 36 are turned off when the at least one door 16 is closed.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hazard alert system comprising:
a vehicle having a back side and at least one door being hingedly coupled to said vehicle, said at least one door being positionable in an open position having said at least one door extending outwardly from said vehicle, said door having an inner surface and an outer edge; and
an alert being coupled directly to said at least one door wherein said alert is configured to issue a visual alert when said at least one door is in said open position, said alert comprising
a panel having a first surface and a second surface, and
an adhesive layer being coupled to said first surface, said adhesive layer completely covering said first surface, said adhesive layer adhesively engaging said inner surface such that said panel is retained on said at least one door, said panel being positioned in spaced relationship adjacent to said outer edge, said panel extending between a bottom edge proximate a bottom of said at least one door to a top edge positioned proximate to a bottom edge of a window in said at least one door, said second surface facing said back side of said vehicle when said at least one door is positioned in said open position wherein said panel is configured to be visible to the oncoming traffic.

2. The system according to claim 1, wherein said vehicle includes an inner surface, an outer edge and at least one door switch, said at least one door switch being operationally coupled to said at least one door such that said at least one door switch detects when said at least one door is positioned in said open position.

3. The system according to claim 1, further comprising a plurality of light emitters, each of said light emitters being coupled to said second surface wherein each of said light emitters is configured to be visible to the oncoming traffic when said at least one door is positioned in said open position, said light emitters being spaced apart from each other and distributed along said panel.

4. The system according to claim 3, further comprising a reflective layer being coupled to said second surface wherein said reflective layer is configured to enhance visibility of said panel with respect to the oncoming traffic when said at least one door is positioned in said open position, each of said light emitters extending through said reflective layer, said reflective layer completely covering said second surface.

5. The system according to claim 4, further comprising:
at least one door switch; and
a power supply being coupled to said panel, said power supply being electrically coupled between each of said light emitters and said at least one door switch, said power supply turning on each of said light emitters when said at least one door switch detects said at least one door is positioned in said open position.

6. A hazard alert system comprising:
a vehicle having a back side and at least one door being hingedly coupled to said vehicle, said at least one door having an inner surface and an outer edge, said at least one door being positionable in an open position having said at least one door extending outwardly from said vehicle, said vehicle including at least one door switch, said at least one door switch being operationally coupled to said at least one door such that said at least one door switch detects when said at least one door is positioned in said open position; and
an alert being coupled to said at least one door, said alert being positioned on said inner surface wherein said alert is configured to issue a visual alert when said at least one door is in said open position thereby facilitating oncoming traffic to avoid said at least one door, said alert comprising:
a panel having a first surface and a second surface,
an adhesive layer being coupled to said first surface, said adhesive layer completely covering said first surface, said adhesive layer adhesively engaging said inner surface such that said panel is retained on said at least one door, said panel being positioned in spaced relationship adjacent to said outer edge, said panel extending between a bottom edge proximate a bottom of said at least one door to a top edge positioned proximate to a bottom edge of a window in said at least one door, said second surface facing said back side of said vehicle when said at least one door is positioned in said open position wherein said panel is configured to be visible to the oncoming traffic,
a plurality of light emitters, each of said light emitters being coupled to said second surface wherein each of said light emitters is configured to be visible to the oncoming traffic when said at least one door is positioned in said open position, said light emitters being spaced apart from each other and distributed along said panel,
a reflective layer being coupled to said second surface wherein said reflective layer is configured to enhance visibility of said panel with respect to the oncoming traffic when said door is positioned in said open position, each of said light emitters extending through said reflective layer, said reflective layer completely covering said second surface, and
a power supply being coupled to said panel, said power supply being electrically coupled between each of said light emitters and said at least one door switch, said power supply turning on each of said light emitters when said at least one door switch detects said at least one door is positioned in said open position.

* * * * *